Aug. 30, 1932.  E. C. LOETSCHER  1,875,056
METHOD OF JOINING THIN WOOD VENEERS
Filed Nov. 18, 1931
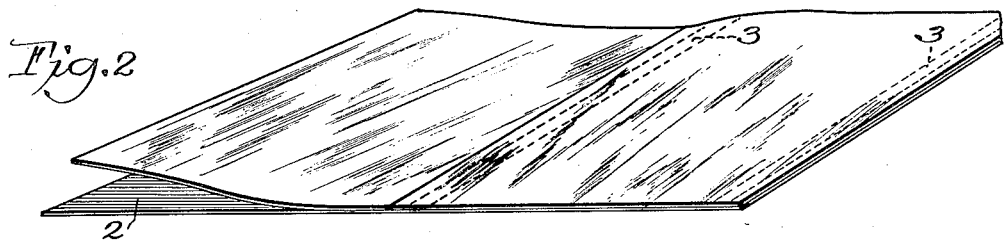
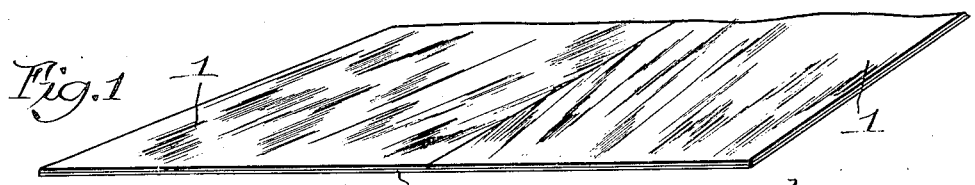
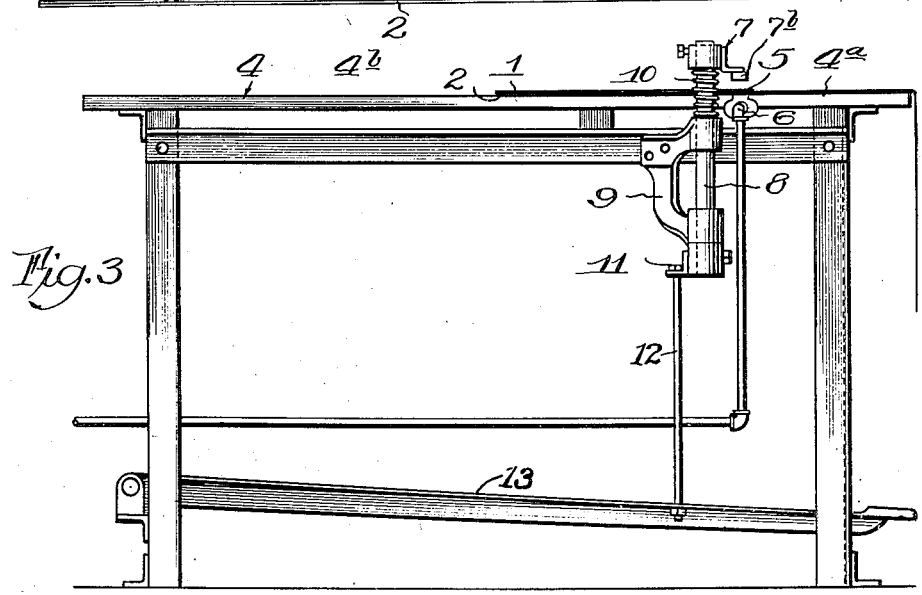
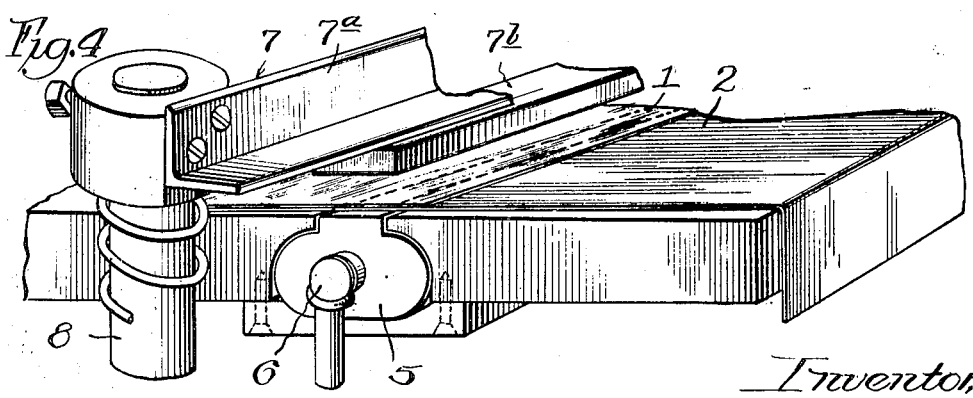
Inventor
Emil C. Loetscher, Patented Aug. 30, 1932

1,875,056

UNITED STATES PATENT OFFICE

EMIL C. LOETSCHER, OF DUBUQUE, IOWA

METHOD OF JOINING THIN WOOD VENEERS

Application filed November 18, 1931. Serial No. 575,706.

This invention relates to improvements in methods of joining sheets of thin wood veneers preparatory to applying the same to a suitable base material in the manufacture of panelling and other veneered products.

In the art of veneering there has more recently been developed the use of very thin wood veneers from 1/80 to 1/100 of an inch in thickness as compared with those of 1/32 to 1/8 inch in thickness more commonly used. Wood reduced to paper thinness manifestly is quite fragile and difficult to handle, and hence is generally made in sheets of relatively small size, so that for the covering of large areas several of these sheets have to be joined together at their edges and the difficulty is to make a joint that will be invisible in the finished surface.

For some classes of work the edges of the veneer sheets can be joined by applying a thin adhesive strip over the edges on the reverse side, or where the base material is compressible the edges can be overlapped and the joint made smooth by the subsequent application of pressure.

These methods are not entirely practical or satisfactory under all conditions, particularly when the base material is of non-yieldable material such as sheet-metal or the finishing layer of veneer is so thin that any overlapping or multiplying of thickness would be visible on the finished surface. For general use the butt type of joint is the most satisfactory, that is, one in which the sheets are brought together edge to edge, although rather difficult to accomplish commercially because of the thinness of the material being handled and the possibility of either a slight overlap or separation at the edges, either of which would spoil the appearance of the finished surface.

The object, therefore, of the present invention is to provide a method for joining the edges of thin wood veneers with a butt joint, together with a suitable type of apparatus for accomplishing the results in a practical and commercially approved manner.

Referring to the accompanying drawing,

Figure 1 is a perspective view of a section of the prepared veneering material;

Figure 2 is a perspective view of the several sheets of material prior to their assembly to show their relative positions and areas of adhesion;

Figure 3 is a view in end elevation of an apparatus for applying and joining the sheets of veneer; and Figure 4 is an enlarged detail view in perspective of the heating and pressing elements of the apparatus shown in Figure 3.

The method of assembling the veneering materials will first be described, to be followed by the disclosure of a suitable apparatus for the purpose. As already suggested, the veneering materials are paper-thin sheets 1, 1 of natural wood which are obtainable in thicknesses to 1/100 of an inch and in the various hard woods for use in the manufacture of decorative wall coverings, panellings, doors and interior trim. Because of their reduced thickness, the sheets must be carefully handled and usually in a moist condition to avoid curling and splitting, and to obtain perfectly true edges a large number of sheets are stacked and the edges planed as is common in the preparation of all veneering materials.

The sheets of veneer shown as two in number are applied to a sheet of paper 2 which has been previously coated or impregnated with a solution of phenol-condensation product, commonly termed bakelite varnish, and then dried to drive off the solvent. The sheet of paper is preferably of the length and width of the panel or other surface to be covered, so that the number of sheets of veneer used will completely cover the paper with their edges in abutting contact. As shown, the sheet 2 of paper has a width equal to the width of wood veneer, although three or more widths may be used for a single panel. The veneer sheets may be six or more feet in length, with the grain running lengthwise so that a single covering sheet of the veneering material built up of several widths of the wood veneer abutting at their edges and attached to a backing of paper serves to cover the surface of a panel or other section of the area to be decorated.

The method followed in preparing the veneering material is substantially as follows: Assuming a flat table on which a bakelite-impregnated paper 2 is spread and the sheets of wood veneer 1, 1 laid thereon and their edges brought together in abutting contact, it will be seen that by applying heat and pressure along the edges of the wood veneer the bakelite content of the paper would be softened just enough to become sticky or tacky and thus cause the marginal portions of the veneer to adhere securely to the backing sheet but without raising the temperature of the bakelite above the critical point at which it becomes cured and goes over into its infusible state upon cooling. In other words, the superimposed sheets of veener and paper are merely heated enough to bring about a temporary joining or tacking of plies together.

As a matter of fact, the extreme edges of the wood veneer do not have to be tacked down since the adhesion may be confined to a narrow strip or area 3 spaced inwardly a short distance from the extreme edges, as shown in Figure 2, thus leaving the areas between the lines of adhesion quite free.

This partial adhesion of the wood veneer to the backing sheet is only temporary, however, for these assembled sheets are then to be applied to the surface of the base of the panel or other article being produced, this being accomplished by compressing the superimposed materials in a press, meanwhile raising its temperature sufficiently high to fuse the bakelite content of the backing sheet, thereby effecting a permanent bond between the base, the backing sheet and the wood veneer to form the final composite material. A press equipped with steam heated platens is generally used for the pressing and heating operations which is more or less well known in the art, and therefore need not be described in detail.

However, a machine or apparatus for tacking the wood veneer sheets to the backing sheets is quite essential for commercial production, and such a machine has been devised for putting the method into practical use.

Briefly, the apparatus consists of a table (Figures 3 and 4) relatively long in comparison with its width. There is nothing peculiar about the general construction of the table except that its top 4 is divided lengthwise into a front section 4ª and a somewhat wider rear section 4ᵇ by a heater 5 consisting of a hollow pipe-like casing, round for the most part but having a flat side placed uppermost to lie flush with the surface of the table (Figure 4). Pipe connections 6 with opposite ends of the casing provide for the circulation of steam for heating the pipe, although for all practical purposes any other type of heating element may be used, as for instance an electric heating coil.

Now extending lengthwise of the table and above the heating element 5 is a presser bar 7 in the form of an angle iron 7ª with a flat bar 7ᵇ fixed to the under side of the horizontal web thereof. The presser bar is supported at its ends on vertical push rods 8 which in turn are slidably mounted in brackets 9, 9 projecting from the ends of the table, with coil springs 10 betwen the brackets and the bar to normally hold the latter in spaced relation above the heating element 5. Below the table top 4, the lower ends of the push rods are joined by an angle bar 11 extending lengthwise beneath the table, the central portion of this bar being connected by a vertical link 12 to a treadle bar 13 pivoted at the lower rear portion of the table, the same being obviously foot-operated to depress the presser bar against veneering material as it is assembled on the table. Thus, the most satisfactory method of procedure is the following: One edge portion of a large backing sheet of resin-impregnated paper is laid lengthwise along the forward section of the table top and a sheet of thin wood veneer is spread on top of it and properly registered. Then the forward edges of superimposed sheets are fed forward over the heating element and the presser bar is depressed long enough to effect the adhesion along the edge, it being understood, of course, that the heater is maintained at the softening temperature of the resin impregnation of the backing sheet. The first tacking operation being completed, the sheets are again advanced and the opposite edge of the wood veneer is tacked by adhesion to the backing sheet whereupon the next or second wood veneer sheet is carefully applied by hand with its edge abutting the edge of the sheet already tacked down, and finally, holding the same in place upon the backing sheet the assembled sheets are again advanced and the same tacking operation repeated.

This method of tacking thin sheets of wood veneer to backing sheets of resin treated paper is believed to be far superior to other methods of obtaining satisfactory and workmanlike results in the manufacture of wood veneered products, for experience has shown that joints formed by overlapping or by applying tape beneath the edges, while perhaps easier, is not productive of satisfactory results, inasmuch as the joint appears in the surface. On the other hand, any attempt to form a perfect butt joint by other methods dependent upon the skill and care of the workman, invariably results in a separation at the joint, leaving a streak that is quite as objectionable as an overlapping or taped joint.

By the present method the sheets of veneer are fixed in the proper relation to each other preparatory to the final assembling process so that a perfect joint may be invariably expected, with the attendant minimizing of loss of time and waste of materials.

I claim as my invention:

1. The method of preparing sheets of thin wood veneer for permanent application to the surface of a base material consisting of applying two or more sheets of said veneer to a backing sheet of fibrous material with their adjacent edges in abutting contact and temporarily adhering said veneer sheets to said backing sheet throughout predetermined areas of their contacting surfaces.

2. The method of joining sheets of thin wood veneer preparatory to permanent application to the surface of a base material, consisting of applying two or more sheets of said veneer to a backing sheet of fibrous material impregnated with a resinous substance, with the edges to be joined in abutting relation and temporarily adhering said veneer sheets to said backing sheets by applying heat and pressure along the edges to be joined.

3. The method of preparing sheets of thin wood veneer for mounting on the surface of a base material consisting of applying said veneer sheets with their edges in abutting contact to a sheet of fibrous material coated with a resinous substance and applying heat and pressure along the edges of said superimposed sheets sufficient to effect the partial adherence of said sheets to each other.

4. The method of joining sheets of thin wood veneer preparatory to application to the surface of a base material, consisting of applying said veneer sheets to a backing sheet of resin impregnated paper with their edges in abutting contact, applying sufficient heat and pressure along the abutting edges of said superimposed sheets to soften the resin content of the paper and effect a temporary adherence of the veneer sheets to said backing sheet.

5. The method of preparing sheets of thin wood veneer for mounting on the surface of a base material consisting of applying said veneer sheets with their edges in abutting contact to a sheet of fibrous material coated with a resinous substance, applying sufficient heat to the backing sheet to soften the resin and pressing the marginal portions of the veneer sheets to the heated area of the backing sheet.

6. The method of preparing sheets of thin wood veneer for mounting on the surface of a base material consisting of applying said veneer sheets with their edges in abutting contact to a backing sheet of paper impregnated with a phenol condensation product and applying sufficient heat and pressure throughout narrow areas paralleling the jointed edges of said veneer sheets to soften the phenol condensation product and effect a temporary adherence of the veneer sheets to said backing sheet.

Signed at Dubuque, Iowa, this 13 day of November, 1931.

EMIL C. LOETSCHER.